United States Patent
Stalnecker

(10) Patent No.: US 10,148,806 B1
(45) Date of Patent: Dec. 4, 2018

(54) SYSTEM AND METHOD OF INTERCEPTING TEXT MESSAGES

(71) Applicant: Frederick Davis Stalnecker, Memphis, TN (US)

(72) Inventor: Frederick Davis Stalnecker, Memphis, TN (US)

(*) Notice: Subject to any disclaimer, the term of this patent is extended or adjusted under 35 U.S.C. 154(b) by 0 days.

(21) Appl. No.: 15/852,673

(22) Filed: Dec. 22, 2017

(51) Int. Cl.
| | |
|---|---|
| *H04M 1/725* | (2006.01) |
| *H04W 4/02* | (2018.01) |
| *H04W 4/14* | (2009.01) |
| *H04W 4/90* | (2018.01) |

(52) U.S. Cl.
CPC ... *H04M 1/72577* (2013.01); *H04M 1/72538* (2013.01); *H04M 1/72541* (2013.01); *H04M 1/72569* (2013.01); *H04W 4/027* (2013.01); *H04W 4/14* (2013.01); *H04W 4/90* (2018.02); *H04M 2242/04* (2013.01); *H04M 2242/30* (2013.01); *H04M 2250/10* (2013.01)

(58) Field of Classification Search
USPC .......................................................... 455/418
See application file for complete search history.

(56) References Cited

U.S. PATENT DOCUMENTS

| | | | | |
|---|---|---|---|---|
| 2012/0268235 | A1* | 10/2012 | Farhan | ............... G05B 9/02 340/3.1 |
| 2016/0050309 | A1* | 2/2016 | Gooberman | ...... H04M 1/72577 455/418 |

* cited by examiner

*Primary Examiner* — Joshua L Schwartz
(74) *Attorney, Agent, or Firm* — Dunlap Bennett & Ludwig PLLC

(57) ABSTRACT

A system and method of intercepting text messages. A mobile device includes a processor, a memory storing data including a first threshold velocity, a user interface, a communications interface, a notification module operable to produce a notification when the mobile device receives a text message via the communications interface, and a velocity sensor operable to determine a velocity of the mobile device comprising a distance traveled by the mobile device per unit of time. When the mobile device receives a text message via the communications interface, the processor determines the velocity of the mobile device via the velocity sensor, and either activates the notification module if the mobile device is traveling under the first threshold velocity, or prevents the activation of the notification module if the mobile device is traveling over the first threshold velocity.

7 Claims, 2 Drawing Sheets

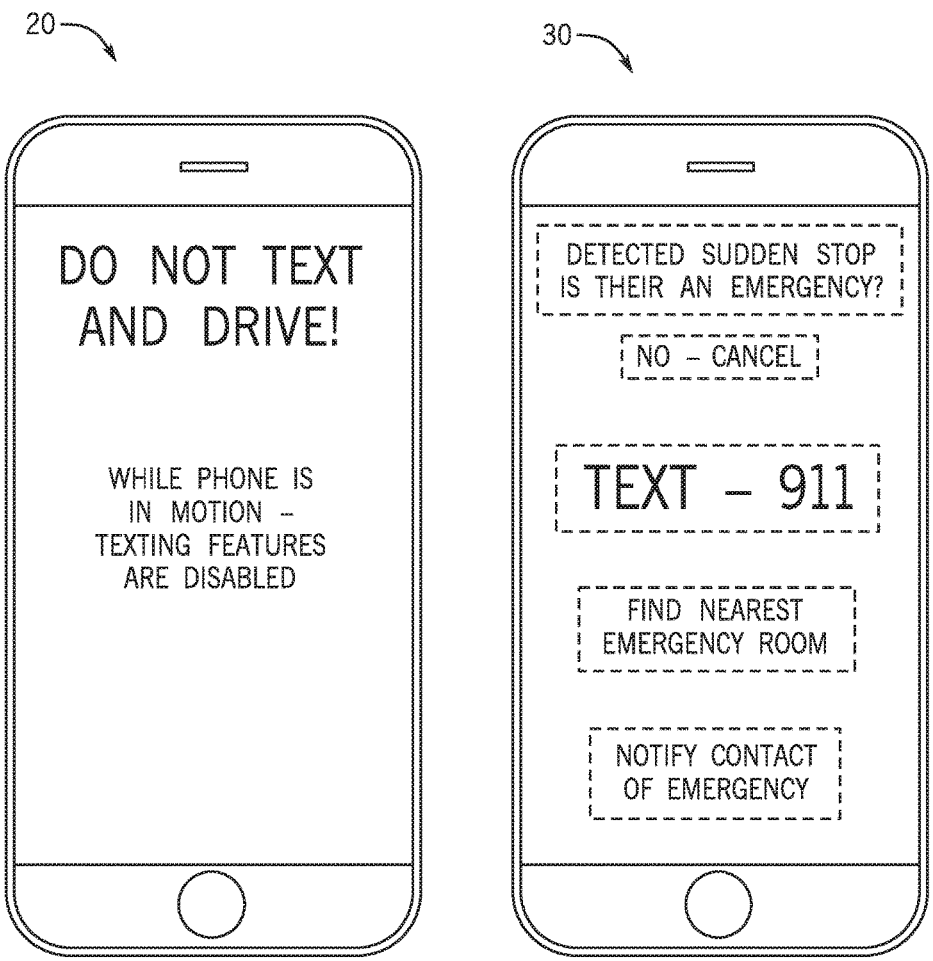

SYSTEM AND METHOD OF INTERCEPTING TEXT MESSAGES

BACKGROUND OF THE INVENTION

The present invention relates to text messages and, more particularly, to intercepting text messages while driving.

Texting while driving, also called texting and driving, is the act of composing, sending, receiving, and/or reading text messages, email, or making other similar use of the web on a mobile phone while operating a motor vehicle. Texting while driving is considered dangerous by most people, including authorities, and in some places, has either been outlawed or restricted. A study involving commercial vehicle operators conducted in September 2009 concluded that though incidence of texting within their dataset was low, texting while driving increased the risk of accident significantly. Needless to say, as of the date accompanying this document, many now consider texting and driving a risk to human life like never before as it is now responsible for 30% to 40% of all traffic deaths. More people are killed by texting and driving than by driving under the influence of alcohol or drug use.

As can be seen, there is now a need for a software application that intercepts text messages while the user is driving.

SUMMARY OF THE INVENTION

In one aspect of the present invention, a system for intercepting text messages comprises: a mobile device comprising: a processor; a memory storing data comprising a threshold velocity; a user interface; a communications interface; a notification module operable to produce a notification when the mobile device receives a text message via the communications interface; and a velocity sensor operable to determine a velocity of the mobile device comprising a distance traveled by the mobile device per unit of time, wherein when the mobile device receives a first text message via the communications interface, the processor determines the velocity of the mobile device via the velocity sensor; and either activates the notification module if the mobile device is traveling under the threshold velocity; or prevents the activation of the notification module if the mobile device is traveling over the threshold velocity.

In another aspect of the present invention, a computer implemented method of intercepting text messages comprises: receiving a text message by a mobile device via a communications interface of the mobile device over a communications network; sensing a velocity of the mobile device via a velocity sensor of the mobile device; and determining whether the mobile device is traveling above a first threshold velocity by a processor of the mobile device, wherein the processor either activates a notification module of the mobile device if the processor determines the mobile device is traveling less than the first threshold velocity; or prevents the activation of the notification module if the mobile device is traveling over the first threshold velocity.

These and other features, aspects and advantages of the present invention will become better understood with reference to the following drawings, description and claims.

BRIEF DESCRIPTION OF THE DRAWINGS

FIG. 2 is a screen shot of an embodiment of the present invention run as an application on a mobile device; and FIG. 3 is a screen shot of an embodiment of the present invention run as an application on a mobile device.

DETAILED DESCRIPTION OF THE INVENTION

Figure 1:
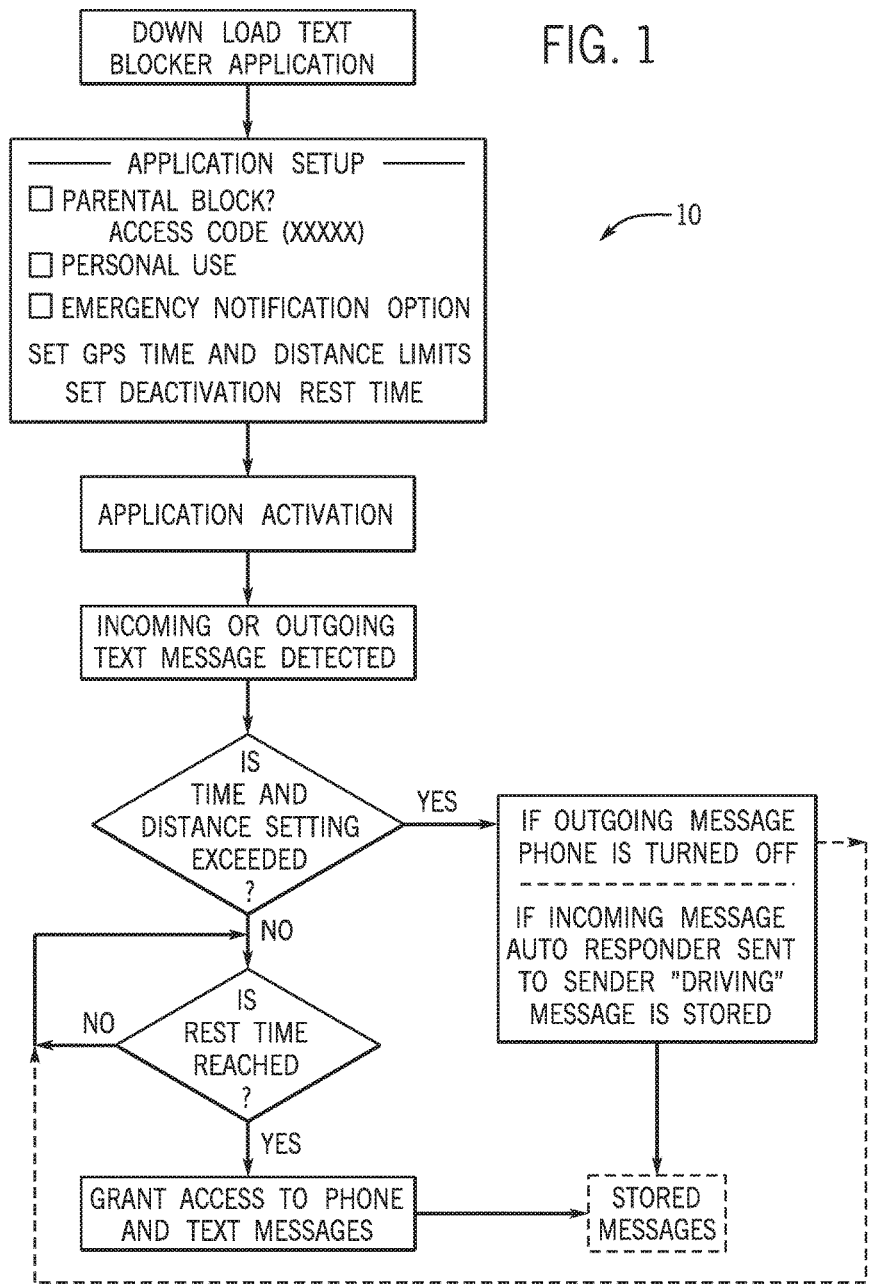
FIG. 1 is a flowchart of a method of an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes an application that stops texting and driving, and thereby saves lives. The mobile device application utilizes the global positioning system (GPS) of a driver's mobile device so that the application knows when a person is driving or moving faster than a person could walk. While driving, incoming texts are intercepted and stopped from distracting a driver. Once the car has stopped, the messages are delivered to the driver. In certain embodiments, the present invention may also auto-text back to the sender and with a message telling the sender the driver is presently driving and that their text will be delivered once the driver stops the car. All of the above may be performed silently so that the driver is not distracted while driving.

Referring to FIGS. 1 through 3, the present invention includes a system and method of intercepting text messages. The present invention includes a mobile device, such as a smart phone. The mobile device includes a processor, a memory storing data including a first threshold velocity, a user interface, a communications interface, a notification module operable to produce a notification when the mobile device receives a text message via the communications interface, and a velocity sensor operable to determine a velocity of the mobile device comprising a distance traveled by the mobile device per unit of time. When the mobile device receives a text message via the communications interface, the processor determines the velocity of the mobile device via the velocity sensor, and either activates the notification module if the mobile device is traveling under the first threshold velocity, or prevents the activation of the notification module if the mobile device is traveling over the first threshold velocity.

The mobile device of the present invention is a phone with a computing system. The computing system is at least the processor and the memory. The computing system may execute on any suitable operating system such as IBM's zSeries/Operating System (z/OS), MS-DOS, PC-DOS, MAC-iOS, WINDOWS, UNIX, OpenVMS, ANDROID, an operating system based on LINUX, or any other appropriate operating system, including future operating systems.

In particular embodiments, the computing system includes a processor, memory, a user interface, and a communication interface. In particular embodiments, the processor includes hardware for executing instructions, such as those making up a computer program. The memory includes main memory for storing instructions such as computer program(s) for the processor to execute, or data for processor to operate on. The memory may include an HDD, a floppy disk drive, flash memory, an optical disc, a magneto-optical disc, magnetic tape, a Universal Serial Bus (USB) drive, a solid-state drive (SSD), or a combination of two or more of these. The memory may include removable or non-removable (or fixed) media, where appropriate. The memory may be internal or external to computing system, where appropriate. In particular embodiments, the memory is non-volatile, solid-state memory.

The user interface includes hardware, software, or both providing one or more interfaces for user communication with the computing system. As an example and not by way of limitation, the user interface may include a keyboard, keypad, microphone, monitor, mouse, printer, scanner, speaker, still camera, stylus, tablet, touchscreen, trackball, video camera, another user interface or a combination of two or more of these. The notification module may be part of the user interface. For example, the notification module may include a speaker, a vibration device, a touchscreen, lights and the like. When the notification module is the speaker, the notification is a sound produced by the speaker. When the notification module is the touchscreen, the notification is a message displayed on the touchscreen. When the notification module is the vibration device, the notification is a vibration. Further, the notification module may be a combination of the above-mentioned user interfaces and may thereby produce a combination of notifications.

The communication interface includes hardware, software, or both providing one or more interfaces for communication (e.g., packet-based communication) between the computing system and one or more other computing systems or one or more networks. As an example, and not by way of limitation, communication interface may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface. As an example, and not by way of limitation, the computing system may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing system may communicate with a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these. The computing system may include any suitable communication interface for any of these networks, where appropriate.

The velocity sensor of the present invention may be any sensor that is capable of detecting velocity of the mobile device. For example, the velocity sensor may be a global position system of the mobile device. The global position system is a positional speedometers, based on how far the receiver has moved since the last measurement. The distance between cellular towers may also be used to show related movement and positioning.

To use the present invention, a software application may be downloaded using the Internet and installed on the mobile device. After installing the software application, the user may be prompted to create a free or paid account for registration. Then the user may be prompted to enter an area code and phone number to facilitate further uses within and outside of this application. After that an email is sent for conformation purposes. Then the present invention is ready to operate by intercepting texts received by the mobile device when the mobile device is exceeding the threshold speed.

As mentioned above, the present invention uses the GPS of the mobile device. The GPS detects that the user is driving. In certain embodiments, the data stored on the memory may include a preprogrammed threshold velocity, such as about 3 mph up to about 15 mph, about 8 mph up to about 12 mph, or about 10 mph. Once the user has reached the threshold velocity, text messages are intercepted and then an auto-text message may be sent back to the original sender informing them that the person they are trying to text is driving and that their text will be displayed as soon as the car stops moving. There may also be a suggestion in the text to call the driver as it is much safer to make a voice call than to text.

In certain embodiments, the data stored on the memory further includes a threshold rest time. In such embodiments, the processor activates the notification module only if the mobile device is traveling under the threshold velocity for at least the threshold rest time. Otherwise, the notification module is not activated. For example, if a driver were to stop at a stop light and then continue driving, the notification module would not be activated because the car was not stopped for at least the threshold rest time. The threshold rest time may be about 5 minutes up to about 15 minutes, such as about 10 minutes.

In certain embodiments, the present invention may include a 911 button that when pressed asks the user if they are sure that they want to call 911. When the user presses the "Yes" button the phone auto dials 911 and puts the phone in speaker mode. This allows anyone even if injured to talk to the operator at 911 and declare an emergency. The present invention may also interrupt the call every 30 seconds and tell the 911 operator where the phone is so that police can find the emergencies location even if the user cannot verbally tell them. An auto-text also takes place at this time and the pre-selected contacts may receive an auto-text telling them that the user has declared a 911 emergency. Further, the text message may provide directions to the distressed user via GPS. In certain embodiments, the present invention may include an ER button that when pressed asks the user if they are sure. When the users press the "Yes" button the phone pulls from the net the GPS coordinates of the closest Emergency Rooms. The application may produce a map having a marker of the user's location and markers indicating a location of a plurality of different Emergency Rooms. The user may select a marker of an Emergency Room from the plurality of Emergency Rooms, and the app may produce directions to the selected Emergency Room via the GPS. In certain embodiments, a speaker phone tells the user of the app how to get to the closest one. An auto-text also takes place at this time and the pre-selected contacts may receive an auto-text telling them that the user has contacted the ER. Further, the text message may provide directions to the distressed user via GPS.

In certain embodiments, the data may further include a second threshold speed and a threshold time. In such embodiments, the processor automatically produces the emergency button on the user interface if the mobile device is travelling over the second threshold speed and comes to a stop under the threshold time. Therefore, the present invention detects a potential crash and allows the user to reach out to an emergency dispatch as soon as possible.

The present invention may also include an "Adolescent" version that cannot be disabled at anytime without the parents pass code being entered therefore making it impossible for a teen to text and drive.

In certain embodiments, the present invention may be used as a resident piece of software/application in all mobile devices, mobile computers and/or future vehicles where mobile devices or other methods of communication are distracting to drivers or operators, making driving safer as it intercepts the texts that distract the driver, motorcyclists, bicyclists, and pedestrians may also use the present invention for increased safety while traveling. Delivery companies or other commercial drivers may be required to have the present invention installed to save lives and lower insurance rates.

In certain embodiments, the present invention may include a feature having remote validated usage through an available database and thereby indicate to an insurance company that the present invention has been in constant use by the insured. This voluntary or involuntary data provides an overview of the individual's driving habits so that insurance premiums may be billed according to the driver's actual personal driving habits. This has the potential to lower the rates for the driver and save thousands of lives as it gives the insured a reason to use the present invention because of a discounted rate due to usage of the application. In this scenario it saves the insured money and It saves the insurance company money since there is no texting and driving by the insured and of course it saves lives. Insurance companies then have less claims, less settlements in the forms of reparation, and an improved database upon which to calculate expenses, premiums, and the actual cause of an accident.

It should be understood, of course, that the foregoing relates to exemplary embodiments of the invention and that modifications may be made without departing from the spirit and scope of the invention as set forth in the following claims.

What is claimed is:

1. A system for intercepting text messages comprising:
   a mobile device comprising:
      a processor;
      a memory storing data comprising a first threshold velocity, a second threshold velocity, and a threshold time;
      a user interface;
      a communications interface;
      a notification module operable to produce a notification when the mobile device receives a text message via the communications interface; and
      a velocity sensor operable to determine a velocity of the mobile device comprising a distance traveled by the mobile device per unit of time, wherein
   when the mobile device receives a first text message via the communications interface, the processor
      determines the velocity of the mobile device via the velocity sensor and either activates the notification module if the mobile device is traveling under the first threshold velocity or prevents the activation of the notification module if the mobile device is traveling over the first threshold velocity; and
      automatically produces an emergency button on the user interface if the mobile device is travelling over the second threshold velocity and comes to a stop under the threshold time, wherein when the emergency button is selected the mobile device calls an emergency dispatcher and provides global positioning coordinates to the emergency dispatcher via the communications interface.

2. The system of claim 1, wherein the user interface is a touchscreen interface.

3. The system of claim 2, wherein the notification module comprises at least one of a speaker and the touchscreen, wherein the notification is at least one of a sound produced by the speaker and a message displayed on the touchscreen.

4. The system of claim 1, wherein the communication interface communicates over a telecommunications network.

5. The system of claim 1, wherein the velocity sensor is a global positioning system of the mobile device.

6. The system of claim 1, wherein the processor
   sends a second text message back to an originator of the first text message over the communications network if the mobile device is traveling over the first threshold velocity, wherein the second text message communicates to the originator that a user of the mobile device is unable to read the first text message.

7. The system of claim 1, wherein the data further comprises a threshold rest time, wherein the processor
   activates the notification module if the mobile device is traveling under the threshold velocity for at least the threshold rest time.

* * * * *